United States Patent [19]
Sellstedt et al.

[11] 3,879,381
[45] Apr. 22, 1975

[54] 7-(2-CARBAMOYL-1-OXASPIRO(2,X)ALKANE-CARBOXAMIDO) PENICILLANIC ACIDS

[75] Inventors: John H. Sellstedt, Montgomery; Daniel M. Teller, Chester, both of Pa.

[73] Assignee: American Home Products Corporation, New York, N.Y.

[22] Filed: Dec. 29, 1972

[21] Appl. No.: 319,413

[52] U.S. Cl. ............ 260/239.1; 424/246; 424/271; 260/243 C
[51] Int. Cl. ...................... C07d 99/16; C07d 99/24
[58] Field of Search ................................. 260/239.1

[56] References Cited
UNITED STATES PATENTS
3,041,333   6/1962   Chow et al...................... 260/239.1

Primary Examiner—Nicholas S. Rizzo
Attorney, Agent, or Firm—Stephen Venetianer

[57] ABSTRACT 7-(2-carbamoyl-1-oxaspiro[2,5]octane-2-carboxamido) cephalosporanic acid and derivatives thereof and 6-(2-carbamoyl-1-oxaspiro[2,5]octane-2-carboxamido)penicillanic acid and derivatives thereof are described. These novel cephalosporins and penicillins have activity against gram positive and/or gram negative bacteria.

5 Claims, No Drawings

7-(2-CARBAMOYL-1-OXASPIRO(2,X)ALKANE-CARBOXAMIDO) PENICILLANIC ACIDS

This invention relates to novel epoxy substituted cephalosporins and penicillins and processes for their manufacture.

In its broadest aspects the present invention relates to novel compounds and their non-toxic salts of the formula

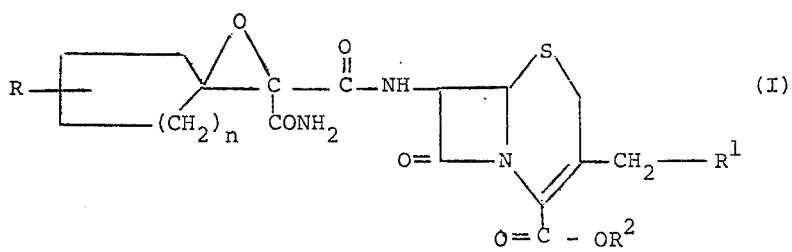

and

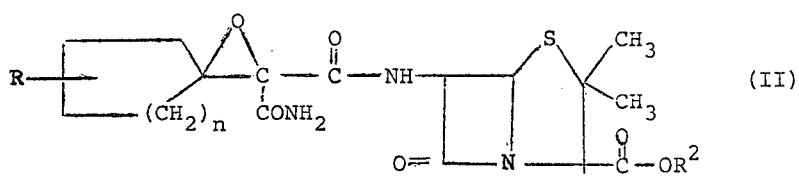

wherein:

R is selected from the class consisting of hydrogen and lower alkyl;

$R^1$ is any non-toxic organic substituent that is considered suitable in the cephalosporin art for substitution at the 3-position on the cephalosporin nucleus by linkage through the methylene group;

$R^2$ is either hydrogen, non-toxic cation or an organic radical which forms a non-toxic ester with the carboxylic acid group; and n is a whole number from 1 through 4.

The substituents represented by $R^1$ are preferably selected from the class consisting of hydrogen, hydroxy, acyloxy derived from a hydrocarbon carboxylic acid having up to eight carbon atoms (e.g. acetoxy, propionoyloxy, butanolyloxy, pentanolyoxy, etc.) and a quaternary ammonium group (e.g. 1-pyridinium, 1-quinolinium, picolinium etc.). Other organic groups may also be used which are defined by a hydroxy group which is esterified with a carboxylic acid and in which the ester oxygens may be replaced by sulfur atoms; a primary, secondary or tertiary amine [e.g. (lower) alkylamino, di(lower)alkylamino, phenyl(lower) alkyl amino, N-heterocyclic tertiary amines etc.]; a guanyl-mercapto group; and a mercapto group which has been etherfied. Illustrative of specific groups defined by $R^1$ are those described in U.S. Pat. Nos. 3,483,197; 3,516,997; 3,533,203; 3,536,698; 3,627,760; 3,637,678; 3,641,021; 3,644,347; Examples of such groups defined by $R^1$ include 5-thiothiazolyl, 5-thiothiadiazolyl, 5-thiotriazolyl, pivaloyloxy, benzoylmercapto, diethylamino, 3-pyrrolidino, etc.

Illustrative of cation and organic groups represented by $R^2$ are:

(1) a metallic cation such as sodium, potassium, calcium, aluminum, etc.; (2) a non-metallic cation formed from a tri(lower) alkylamine or a di(lower)alkylamine (e.g. triethylamine, procaine, dibenzylamine, N,N'-dibenzylethylene diamine, 1-ephenamine); (3) N-(lower)alkyl piperidines (e.g. N-methylpiperidine); (4) a heterocyclic quaternary ammonium group of aromatic character containing nitrogen as the only heterocyclic atom (e.g. pyridinium, quinolinium, picolinium); (5) other non-toxic amines that will form salts with the carboxyl group; (6) an organic group which is capable of smooth reaction with the carboxylic acid group to form an ester and is stable during reaction of a compound of formulae I and II with a compound containing an active hydrogen and such organic groups being removable chemically or enzymatically under mild conditions without destruction of the penicillin or cephalosporin nucleus.

Illustrative of such organic groups are aryl, aryl(lower) alkylene, cycloalkyl, substituted aryl(lower)alkylene, halo(lower) alkyl, $C_3$-$C_7$ tert(lower)alkyl, aroyl-$CH_2$-, substituted aroyl-$CH_2$-, diarylmethylene, substituted diarylmethylene, phthalimido(lower) alkylene, succinimido(lower)alkylene, $C_5$ to $C_7$ tert-alkenyl, $C_3$ to $C_7$ tert-alkynyl, tri(lower)alkyl silyl, di(lower)silene esters as described in U.S. Pat. No. 3,654,266, 1,3,2 dioxaphosphoranyl, etc. A more detailed list of $R^2$ groups is found in U.S. Pat. Nos., 3,249,622; 3,284,451; 3,466,275; 3,483,188; 3,485,819; 3,553,203; 3,588,602; 3,574,799; 3,621,011; 3,635,953; 3,654,266; 3,655,658; 3,660,395; the disclosures of which are incorporated herein by reference.

Preferably $R^2$ is selected from the group defined supra by hydrogen, a metallic cation and a non-metallic cation formed from a trialkylamine or a dialkylamine.

The term (lower)alkyl means a straight or branched chain having one through six carbon atoms (e.g. methyl, ethyl, isopropyl, hexyl, etc.).

The novel cephalosporins and penicillins of the present invention may be prepared in accordance with the following reaction sequence

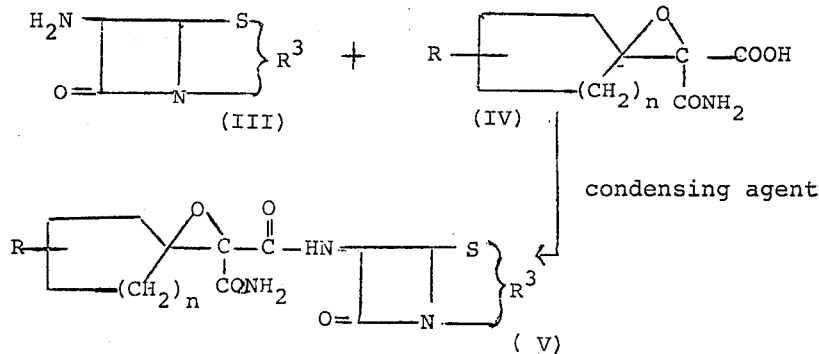

wherein $R^3$ may be either

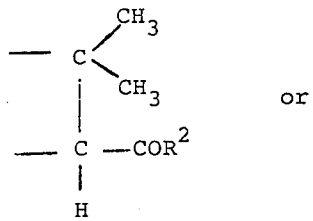

The starting materials defined by formula IV are described in the literature [J. Org. Chem., 28, 3088 (1963)] or can be prepared by conventional prior art techniques. The starting materials of formula III are either commercially available such as 6-APA or 7-ACA or their preparation is described in the prior art. In preparing the compounds of this invention, a carboxylic acid of formula IV is reacted with a carboxyl group activating reagent in the presence of a tertiary amine (e.g. triethyl amine, N-ethylpiperidine, etc.) in an inert anhydrous organic solvent at a temperature below +20°C. As solvents, toluene, tetrahydrofuran, dichloromethane, chloroform, ethylenedichloride, etc. may be employed. After formation of the activated ester of the carboxylic acid starting material of IV, a compound of formula III is added in the form of a solution containing a strong base and a water/organic solvent mixture. The reaction of a compound of formula III with the activated ester is carried out at a temperature in the range of −15° to about 40°C. Illustrative of suitable carboxyl group activating reagents are carbonyldiimidazole, dicyclohexyl carbodiimide, isobutyl chloroformate, N-hydroxy succinimide, ethylchloroformate, etc.

The following examples are illustrative of the preparation of the compounds of the present invention.

EXAMPLE 1

7-(2-Carbamoyl-1-oxaspiro [2,5]octane-2-carboxamido)cephalosporanic acid

To a suspension of 2-carbamoyl-1-oxaspiro[2,5]octane-2-carboxylic) acid (0.50 g, 0.0025 moles) in dry tetrahydrofuran (10 ml) containing triethylamine (0.35 ml) at −10°C under nitrogen is added all at once isobutyl chloroformate (0.35 ml, 0.0050 moles). The mixture is stirred at −10°C for 10 minutes and a solution of 7-ACA (0.68 g, 0.0025 moles) and triethylamine (0.35 ml) in water/tetrahydrofuran (1:1, 10 ml) is added all at once. The mixture is stirred at 5°C for one hour and 25°C for one hour. The tetrahydrofuran is evaporated in vacuo <40°C and a solution of 60 ml of water and 20 ml of ethyl acetate is added. The mixture is shaken thoroughly and the organic layer discarded. The aqueous layer is cooled to 5°C, 60 ml of ethyl acetate is added and the mixture acidified to pH = 2.9 with 10 percent aqueous hydrochloric acid. The organic layer is separated and the aqueous layer is extracted with 40 ml of ethyl acetate. The combined extract and organic layer are washed with water, brine and dried over anhydrous sodium sulfate. Evaporation in vacuo <40°C leaves a glass, mp. 98°–100°C $\lambda_{max}^{KBr}$ 3.00, 5.61, 5.90; NMR has sharp singlet at 2.02 ppm.

EXAMPLE 2

6-(2-Carbamoyl-1-oxaspiro[2.5]octane-2-carboxamido)penicillanic acid potassium salt To a solution of 2-carbamoyl-1-oxaspiro 2,5 octane-2-carboxylic acid (0.50 g, 0.0025 moles) in dry dimethylformamide (5.0 ml) at room temperature is added carbonyl diimidazole (0.41 g, 0.0025 moles) under nitrogen. Carbon dioxide evolution begins immediately. After 30 minutes at room temperature the residual carbon dioxide is removed under vacuum, the mixture cooled to −10°C and a solution of 6-APA (0.54 g, 0.0095 moles) in dry methylene chloride (10 ml) containing triethylamine (1.04 ml) is added all at once. After stirring 2 hours at room temperature, the methylene chloride is removed in vacuo at 40°C, n-butanol (2.5 ml) is added then potassium ethyl hexanoate (1.25 ml of a 2 M solution in n-butanol). After stirring 10 minutes, ethyl ether (100 ml) is added, the product filtered and dried in vacuo at room temperature to yield a tan solid, mp. 210-215°C(d); $\lambda_{max}^{KBr}$ 5.63, 5.90, 6.18μ; NMR has 1.51 and 1.59 ppm peaks.

EXAMPLE 3
In accordance with the procedure of Example 1, the following cephalosporins can be obtained by reacting the appropriate compounds of formula III with the carboxlic acid of formula IV.
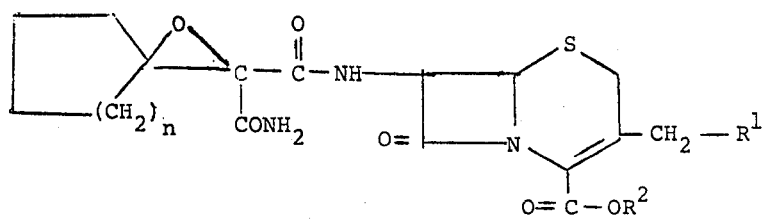
| $R^1$ | $R^2$ | n |
|---|---|---|
| H | H | 2 |
| 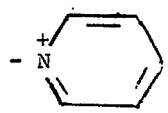 | Na | 1 |
| 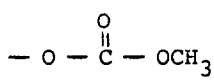 | K | 3 |
| $-S-CH_3$ | H | 4 |
| 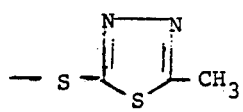 | 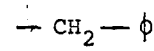 $-CH_2-\phi$ | 2 |
| 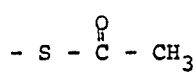 | 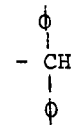 | 3 |
| 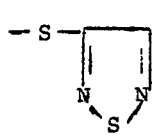 | 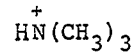 $\overset{+}{H}N(CH_3)_3$ | 2 |
| 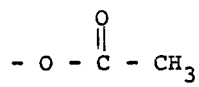 | 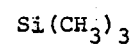 $Si(CH_3)_3$ | 3 |
| H | 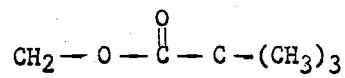 | 1 |

EXAMPLE 4

In accordance with the procedure of Example 2, the following penicillins can be obtained by reacting the appropriate compounds of formula III with the carboxylic acid of formula IV.

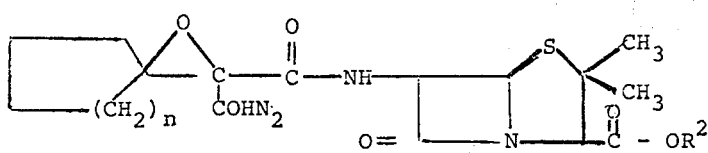

| $R_2$ | $n$ |
|---|---|
| H | 1 |
| K | 4 |
| $- CH_2 - \phi$ | 3 |
| $- OSi(CH_3)_3$ | 3 |
| $- P \overset{O-}{\underset{O-}{\diagup}}\rceil$ | 2 |
| $H_2\overset{+}{N} - (CH_2 - \phi)_2$ | 2 |
| $-\overset{+}{N}\diagup\!\!\!\diagdown$ | 3 |
| $- C(CH_3)_3$ | 1 |
| $-CH_2 - O - \phi$ | 4 |
| $CH_2-O-\overset{O}{\underset{\|}{C}}-C-(CH_3)_3$ | 2 |

The cephalosporin and penicillin compounds of this invention exhibit antibacterial activity in in vitro tests against gram positive and gram-negative microorganisms. These compounds are tested in vitro by the agar plate dilution method as follows:

A stock solution of the test compound at 10,000 μg/ml is prepared. Two-fold dilutions are made with sterile water, and 1 ml quantities of each dilution are incorporated in 9 ml of seed agar in sterile petri dishes. Hardened surfaces are inoculated with test organisms and incubated 18 hours at 35°C. The activity of the test compound is measured as the minimal inhibitory concentration expressed in μg/ml, defined as the least amount of material that completely inhibits the test organism.

When the non-toxic cephalosporins and penicillins are employed pharmaceutically, i.e. as antibacterial agents, they may be administered to a host afflicted with a bacterial infection alone or in combination with pharmaceutically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosage substantially less than the optimum dose of the compound. Thereafter, the dosage is increased by small increments until the optimum effect under the circumstances is reached. It will generally be found that when the composition is administered orally, the larger quantities of the active agent will be required to produce the same effect as a smaller quantity given parenterally.

What is claimed is:

1. A compound represented by the following formula:

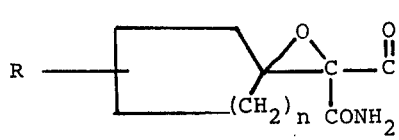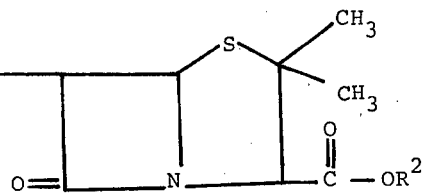

Wherein:

R is selected from the class consisting of hydrogen and (lower) alkyl; $R^2$ is selected from the class consisting of hydrogen, a metallic cation, a non-metallic cation formed from a tri(lower) alkylamine or di(lower)alkylamine, a heterocyclic quaternary ammonium group of aromatic character containing nitrogen as the only heterocyclic atom selected from the class consisting of pyridinium, quinolinium and picolinium, an N-(lower)alkyl piperidine and $n$ is a whole number from 1 through 4.

2. A compound according to claim 1 wherein $R^2$ is hydrogen.

3. A compound according to claim 1 wherein the quaternary ammonium group is pyridinium.

4. A compound according to claim 1 which is: 6-(2-carbamoyl-1-oxaspiro [2,5]octane-2-carboxamido) penicillanic acid.

5. The compound of claim 4 in the form of a non-toxic salt.

* * * * *